Patented June 5, 1951

2,555,465

UNITED STATES PATENT OFFICE 2,555,465

FLAVORING COMPOSITIONS AND METHOD OF MAKING SAME

Herman H. Bogin and Rufus D. Feick, Detroit, Mich., assignors to Parke, Davis & Company, Detroit, Mich., a corporation of Michigan No Drawing. Application May 5, 1949, Serial No. 91,643

5 Claims. (Cl. 99—140)

This invention relates to the preparation of comminuted solid products in a form capable of maintaining the original physical and chemical characteristics without deterioration for extended periods of time under normal conditions of storage and marketing. More particularly, the invention is concerned with the preparation of stable, water-soluble, non-hygroscopic powders containing one or more normally liquid, volatile, unstable flavoring ingredients.

The ordinary natural and synthetic flavors such as are well-known to the trade are liquids which are highly volatile, extremely sensitive to oxidation by atmospheric oxygen and consist of various combinations of essential oils, alcohols, aldehydes, ketones and esters. Due to the aforementioned volatility many of these extracts lose some of their original flavor or odor or both upon storage. The liquid nature of these flavoring materials makes it very difficult to combine them with solids such as gelatin in the preparation of puddings and tooth powders in the preparation of flavored tooth powders.

In the present state of the art, attempts have been made to eliminate the disadvantages inherent in liquid flavoring materials by packaging materials containing the same in airtight containers. This method of packaging suffers from many disadvantages such as the high cost of the containers, the care with which they must be sealed, leakage and uncertain period of protection. Moreover, while tight packaging may suffice to carry the goods from the manufacturer to the retailer in relatively good condition the flavoring constitutent of the goods becomes, in many instances, impaired before sale to the consumer. After the consumer opens the package the flavoring material quickly dissipates leaving the consumer with a tasteless, unflavored material and a poor impression of the manufacturer's product.

In the case of gelatin desserts, puddings and the like a great deal of difficulty has been experienced in trying to incorporate and retain the flavoring materials. At the present time the flavoring material is mixed with a small amount of the gelatin in water and the mixture dried to obtain flavored granules of gelatin or else the flavoring material is placed in a soft-shell gelatin capsule. These granules or capsules are then placed with the remaining ingredients in a heavy waxed bag and the bag sealed insofar as possible against leakage. Even these precautions fail to hold the flavoring material under normal storage conditions and in many instances the aldehydic nature of the flavoring material renders the gelatin with which it is in contact insoluble in water by what is commonly termed "tanning."

A similar problem arises in the case of the flavored powders used in the preparation of cooling beverages in the home. Such powders which commonly consist of sugar and a flavoring material quickly lose their flavor after packaging with the result that the consumer obtains a drink which has the desired color but is lacking in flavor.

We have discovered a means whereby normally liquid flavoring materials may be prepared in a solid, stable form, resistant to deterioration either chemically or physically. Our invention consists in incorporating with the normally liquid flavoring material an alkali metal salt of carboxymethyl cellulose or other equivalent cellulose derivative and comminuting the mixture into powder form. The equivalent cellulose derivative need not contain salt-forming carboxyl groups but may contain other groups such as ether groups. Methyl cellulose, for example, can be substituted for the alkali metal salt of carboxymethyl cellulose in the preparation of the products of the invention. The alkali metal salt of carboxymethyl cellulose in intimate mixture with the normally liquid flavoring material serves to protect it from oxidative deterioration and in some unknown manner renders it non-volatile under normal conditions of storage and marketing.

We have found that the alkali metal salts of carboxymethyl cellulose may be used as protective ingredients for all of the known liquid flavoring materials to obtain free flowing, water-soluble, stable powders which can be incorporated into packaged goods to impart flavor thereto. The packaged goods containing the new solid flavoring products of the invention do not, insofar as we have been able to determine, lose their flavor or deteriorate in this respect under normal conditions of storage and use and even under more drastic conditions such as standing unpackaged in contact with the atmosphere for extended periods of time. Some of the packaged goods in which the new flavoring products may be used are gelatin desserts, starch puddings, tooth powders, beverage powders, ice creams and the like. Due to their solid nature the water-soluble flavoring powders of the invention can be measured more readily than the ordinary extracts and liquid flavorings used in the home for flavoring pastries, cakes, icings and the like.

The stability of the instant products against loss of flavor is particularly valuable in this respect since large amounts of flavoring materials are not required for home use and consequently an opened package thereof must retain its strength for as long as several years.

As representative of the many liquid flavoring materials which can be used in the practice of the invention are imitation raspberry, imitation cherry, imitation peach, imitation pineapple, imitation almond, imitation peppermint, imitation loganberry, imitation strawberry, oil of orange, oil of lemon, imitation rum, imitation wintergreen, imitation lemon, imitation vanilla, vanilla extract, oil of lime and the like.

In preparing the products of the invention, the alkali metal salt of the carboxymethyl cellulose and the liquid flavoring material to be stabilized are both incorporated into a liquid vehicle such as water, to form a homogeneous mixture, preferably a solution, and the liquid vehicle evaporated off at a low temperature thereby obtaining a solid product which is then comminuted into powder form. The amount of the alkali metal salt of carboxymethyl cellulose to be used with a particular material depends somewhat upon the volatility of the flavoring material and upon whether it is an oil flavoring or a water-soluble one. In general, satisfactory solid products may be obtained with as little as 10% by weight to as high as several hundred per cent by weight but usually the alkali metal salt of carboxymethyl cellulose is between about 40 to 60% by weight. Due to the non-toxic and bland nature of the cellulose derivative its permissible upper limit in the compositions of the invention is limited solely by economic considerations while the lower limit of 10% by weight appears to be about the minimal amount of cellulose derivative necessary to provide protection of the flavoring material and provide a satisfactory solid product. Generally speaking, however, larger amounts of the cellulose derivative are required with the oily flavoring materials than with the water-soluble flavoring substances. The particular alkali metal salt of the carboxymethyl cellulose used is not critical and hence the sodium or potassium salts are usually used for convenience and economy.

The following examples are illustrative.

*Example 1*

0.9 oz. of sodium carboxymethyl cellulose is dissolved in 8.1 oz. of water. 1 fluid oz. of U. S. P. oil of orange is added to the solution with vigorous stirring. The emulsified mixture is frozen at —40° C. and then the water removed in the form of ice by sublimation near the melting point under a pressure of 2 to 3 mm. When sublimation is complete, about forty-eight hours, the solid so obtained is milled to a free flowing granulation. This solid product upon the addition of water readily yields the orange oil and may be left in contact with air for long periods of time without noticeable loss of the orange flavor. It is non-hygroscopic and does not lump or cake even in contact with moisture-laden air. One example of the many uses to which this product may be put is in the preparation of gelatin desserts as described below.

The solid product containing U. S. P. oil of orange prepared above is mixed with one package of a commercially available unflavored gelatin dessert. The resulting mixture is an orange-flavored gelatin dessert which may be packaged in the usual manner and when so packaged retains its flavor under normal conditions of storage for long periods of time. To prepare the dessert for the table the contents of the package are dissolved in hot water and the solution allowed to cool and gel in a refrigerator or other cool place. The sodium carboxymethyl cellulose used to preserve the orange flavoring material does not interfere with the setting properties of the gelatin.

The orange-flavored solid prepared by the above described method can also be mixed with granulated sugar containing an orange dye to produce a very satisfactory orange drink upon mixing with water. The beverage powder is very stable and retains its flavor under normal conditions of storage.

Oil of lime may be substituted for, or a small amount mixed with, the oil of orange used in the above procedure, if desired.

*Example 2*

0.9 oz. of sodium carboxymethyl cellulose is dissolved in 8.1 oz. of water and 1 fluid oz. of imitation raspberry flavor added rapidly with stirring. The mixture is frozen at about —40° C. and then the ice sublimed therefrom under a pressure of about 2 to 3 mm. while heating the container to about 32° C. The resulting solid is removed from the container and milled to a free flowing granulation. This solid retains the flavor and odor of the original liquid flavoring material for long periods of time and upon solution in water imparts the desired reddish-purple color thereto. It is non-hygroscopic and may be used in the preparation of gelatin dessert, ice cream or beverage powders.

As will be apparent to those skilled in the art, the formula used in the preparation of the imitation raspberry flavoring materials may vary. However, this variance does not affect the nature of the product which we obtain. For example, in our work we obtained equally satisfactory results with the flavorings known in the trade as Raspberry #92 Flavor and Raspberry #500 Flavor, both manufactured by the Polak's Frutal Works. A typical formula for such raspberry flavors [excluding the dye] is as follows:

| | Parts |
|---|---|
| Isobutyl acetate | 425 |
| Isoamyl acetate | 275 |
| Ethyl acetate | 200 |
| Ethyl formate | 35 |
| Benzyl benzoate | 20 |
| Bromelia | 15 |
| Vanillin | 10 |
| Linaloöl | 10 |
| Eugenol | 6 |
| Benzyl acetate | 2 |
| Geraniol | 1 |
| Ionone | 1 |
| Total | 1000 |

*Example 3*

1 fluid oz. of oil of lemon, terpeneless, is added with rapid stirring to an aqueous solution of 0.9 oz. of sodium carboxymethyl cellulose in 8.1 oz. of water and the resulting emulsified mixture frozen at about —40° C. The ice is sublimed from the frozen mass under a pressure of 1 to 2 mm. and the solid so obtained milled to a fine granulation. The solid lemon flavored product so obtained is stable upon prolonged storage. It can be colored, if desired, by spraying it with a solution of tartrazine or, alternatively, the tartrazine can be added to the water during the preparation of the product. One of the many applications for which this new solid flavoring product is particularly adapted is incorporation in the prepared lemon pie fillings now available on the market. At the present time one of these packaged products contains a soft elastic gelatin capsule of the lemon oil. We have found by replacing this capsule with an equivalent amount of our new solid lemon flavoring product that a homogeneous product is obtained which when made up according to the directions with water gives a very satisfactory lemon pie filling. The advantage thus gained is two-fold, first, in the appearance and ease of using the product and, second, in saving the expense of ecapsulating the lemon oil in a soft elastic capsule. Lemon oil, as is known to those skilled in the art, exerts a rapid tanning effect upon gelatin and the product of the instant example is particularly useful in eliminating this problem in flavorings for pie fillings, gelatin desserts, etc.

The lemon powders of this example can also be incorporated in gelatin desserts or beverage powders as indicated in Example 1.

If desired the sodium carboxymethyl cellulose used in the above procedure can be replaced with 1 oz. of methyl cellulose. The solid product obtained when methyl cellulose is used is indistinguishable from that obtained by the use of sodium carboxymethyl cellulose. If acids, other than the weak acids such as citric acid, are to be incorporated with the liquid flavoring materials the methyl cellulose is preferable as there is no possibility of acidification as may be encountered with the alkali metal carboxymethyl celluloses.

*Example 4*

0.5 fluid oz. of imitation loganberry flavor is added with vigorous stirring to a solution of 0.5 oz. of sodium carboxymethyl cellulose in 4.5 fluid oz. of hot water. The resulting solution is cooled, frozen and the water sublimed, in the form of ice, therefrom under reduced pressure [about 1 to 2 mm.]. The solid product thus obtained is friable and is easily milled to a free flowing granulation. It is water-soluble but non-hygroscopic. Insofar as we have been able to ascertain, it retains its flavor and odor for long periods of time without detectable loss. This solid flavoring material can be used in the preparation of gelatin desserts, ice creams and beverage powders.

By following the same procedure and using 0.5 fluid oz. of imitation peach flavor, one obtains a peach-flavored solid having the same characteristics as the solid loganberry flavoring material described above. One of the many imitation peach flavors which can be used for this purpose has the following formula [excluding the dye]:

|  | Parts |
|---|---|
| Cyclohexyl butyrate | 600 |
| Ethyl cinnamate | 140 |
| Benzyl butyrate | 140 |
| Isoamyl butyrate | 70 |
| Isobutyl salicylate | 20 |
| γ-Undecalactone | 20 |
| Geranyl formate | 10 |
| Total | 1000 |

Imitation pineapple flavor composed, for example, of 190 parts of ethyl butyrate and 810 parts of isoamyl isovalerate can also be used instead of the imitation loganberry flavor.

Imitation strawberry or imitation cherry flavors may be substituted for the imitation loganberry flavor used in the above procedure.

*Example 5*

3 oz. of methyl cellulose is dissolved in 30 oz. of water and then 3 oz. of methyl anthranilate [synthetic grape flavoring] added with rapid stirring. The mixture is frozen at about −40° C., the water in the form of ice sublimed therefrom under a pressure of 1 to 2 mm. and the dry solid milled to a fine powder. The solid grape flavoring material thus obtained is stable and does not lose its flavor or deteriorate upon prolonged standing. It is a fine, non-hygroscopic powder which flows freely even in a moist atmosphere. One of the many possible uses of this product is in the preparation of a grape flavored beverage powder. This is accomplished as follows:

The finely granulated grape flavor powder prepared as described above is mixed with 1¼ lbs. of finely powdered tartaric acid, 1 oz. of finely powdered potassium hydrogen tartrate and 5 lbs. of finely granulated sugar and sufficient synthetic grape color is sprayed onto the mass to give the desired shade when 1 tablespoon is mixed with one gallon of water. The dry product thus obtained is readily soluble in water and does not deteriorate noticeably upon storage.

*Example 6*

1 oz. of imitation almond extract having the following formula:

|  | Parts |
|---|---|
| Benzaldehyde | 10 |
| Alcohol 95% | 350 |
| Water | 640 |
| Total | 1000 | is added with rapid stirring to a solution of 0.5 oz. of methyl cellulose in 4.5 oz. of water. The resulting mixture is spray-dried or dried from the frozen state in the manner described in the preceding examples to obtain a free flowing, non-hygroscopic, solid, almond-flavored product.

The above examples are representative of the stable, solid flavoring products which may be obtained in accordance with this invention and which include flavoring substances which are normally liquid, volatile and susceptible to oxidation.

Our invention in its broader aspects consists in a stable, readily milled solid flavoring product containing as one of its ingredients a normally liquid, volatile and unstable flavoring material. The ingredient which imparts these desirable properties to such liquid flavoring materials is preferably an alkali metal salt of carboxymethyl cellulose but other equivalent cellulose derivatives may also be used in lieu thereof such, for example, as methyl cellulose. It should also be understood that, if desired, sugars, dyes and fruit acids, etc. can be incorporated into the product of the invention without departing from the scope or spirit thereof.

What we claim as our invention is:

1. A solid flavoring product comprising an intimate mixture of a normally liquid, volatile and unstable flavoring material and an alkali metal salt of carboxymethyl cellulose.

2. A stable solid product comprising a dried solution of a normally liquid, volatile and unstable flavoring material and an alkali metal salt of carboxymethyl cellulose, said dried solution being substantially free from the solvent and being in comminuted form.

3. A solid flavoring product comprising a normally liquid, volatile and unstable flavoring material and at least 10% by weight of an alkali metal salt of carboxymethyl cellulose.

4. A solid flavoring product comprising an intimate mixture of a normally liquid, volatile and unstable flavoring material and a member of the class consisting of methyl cellulose and alkali metal salts of carboxymethyl cellulose.

5. The method of stabilizing a normally liquid, volatile and unstable flavoring material against volatilization and oxidative deterioration which comprises placing said liquid material together with a member of the class consisting of methyl cellulose and alkali metal salts of carboxymethyl cellulose in an aqueous solvent medium, removing substantially all of the solvent medium therefrom to obtain a solid mixture and comminuting to powder form.

HERMAN H. BOGIN.
RUFUS D. FEICK.

REFERENCES CITED

The following references are of record in the file of this patent:

UNITED STATES PATENTS

| Number | Name | Date |
| --- | --- | --- |
| 2,088,622 | Stokes et al. | Aug. 3, 1937 |
| 2,170,954 | Stange | Aug. 29, 1939 |
| 2,395,061 | Musher | Feb. 19, 1946 |